(12) United States Patent
Wang et al.

(10) Patent No.: US 9,260,108 B2
(45) Date of Patent: Feb. 16, 2016

(54) HYBRID POWERTRAIN AND METHOD FOR CONTROLLING THE SAME

(71) Applicant: GM GLOBAL TECHNOLOGY OPERATIONS LLC, Detroit, MI (US)

(72) Inventors: Lan Wang, Troy, MI (US); Min-Joong Kim, Troy, MI (US); Todd Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 21 days.

(21) Appl. No.: 14/204,136

(22) Filed: Mar. 11, 2014

(65) Prior Publication Data

US 2015/0258981 A1    Sep. 17, 2015

(51) Int. Cl.
| | |
|---|---|
| *B60L 9/00* | (2006.01) |
| *H02P 15/00* | (2006.01) |
| *B60W 20/00* | (2006.01) |
| *B60W 30/19* | (2012.01) |
| *F16H 61/04* | (2006.01) |
| *B60W 10/06* | (2006.01) |
| *B60W 10/08* | (2006.01) |
| *B60W 10/11* | (2012.01) |

(52) U.S. Cl.
CPC ............. *B60W 20/108* (2013.01); *B60W 10/06* (2013.01); *B60W 10/08* (2013.01); *B60W 10/11* (2013.01); *B60W 30/19* (2013.01); *F16H 61/0403* (2013.01); *F16H 2061/0422* (2013.01); *Y10S 903/93* (2013.01)

(58) Field of Classification Search
USPC .................................................. 701/22; 477/8
See application file for complete search history.

(56) References Cited

U.S. PATENT DOCUMENTS

| | | | |
|---|---|---|---|
| 2008/0189018 A1* | 8/2008 | Lang et al. ...................... | 701/54 |
| 2010/0056328 A1* | 3/2010 | Schenk et al. ..................... | 477/8 |
| 2010/0286858 A1* | 11/2010 | Otokawa .......................... | 701/22 |
| 2010/0304923 A1* | 12/2010 | Schenk et al. ..................... | 477/5 |
| 2012/0115677 A1* | 5/2012 | Sakai et al. ....................... | 477/5 |
| 2013/0012353 A1* | 1/2013 | Yoshida et al. ................... | 477/5 |
| 2013/0218389 A1* | 8/2013 | Tanishima et al. .............. | 701/22 |
| 2013/0296128 A1* | 11/2013 | Nefcy et al. ...................... | 477/5 |
| 2013/0297109 A1* | 11/2013 | Nefcy et al. ..................... | 701/22 |

* cited by examiner

*Primary Examiner* — Thomas G Black
*Assistant Examiner* — Tyler Paige
(74) *Attorney, Agent, or Firm* — Quinn Law Group, PLLC

(57) ABSTRACT

A method for controlling a hybrid powertrain includes the following steps: (a) receiving, via a control module, a torque request; (b) commanding, via the control module, the first clutch of an automatic transmission to shift to a disengaged position in response to the torque request; (c) commanding, via the control module, an electric motor-generator to transmit torque to an internal combustion engine until a speed of a second clutch is substantially synchronized with a speed of the internal combustion engine; and (d) commanding, via the control module, the second clutch to shift to the engaged position after the speed of the second clutch is substantially synchronized with the speed of the internal combustion engine. The automatic transmission shifts a transmission speed ratio from an initial speed ratio to a subsequent speed ratio when the second clutch is in the engaged position.

19 Claims, 2 Drawing Sheets

HYBRID POWERTRAIN AND METHOD FOR CONTROLLING THE SAME

TECHNICAL FIELD

The present disclosure relates to a method and system for controlling a hybrid powertrain.

BACKGROUND

Some vehicles include hybrid powertrains. A hybrid powertrain may include an automatic transmission, an internal combustion engine, and at least one electric motor. Accordingly, the vehicle can be propelled by the internal combustion engine, the electric motor, or both.

SUMMARY

In a hybrid powertrain, it is useful to achieve smooth transmission shifts. It is also useful to minimize fuel consumption during operation of the hybrid powertrain. The presently disclosed method can be used to control a hybrid powertrain of a vehicle in order to minimize fuel consumption and achieve smooth transmission shifts. The hybrid powertrain includes an internal combustion engine, at least one electric motor-generator operatively coupled to the internal combustion engine, and an automatic transmission operatively coupled to the internal combustion engine. The automatic transmission includes a plurality of clutches. For instance, the automatic transmission includes at least a first clutch and a second clutch. In an embodiment, the method includes the following steps: (a) receiving, via a control module, a torque request; (b) commanding, via the control module, the first clutch of the automatic transmission to shift to a disengaged position in response to the torque request; (c) commanding, via the control module, the electric motor-generator to transmit torque to the internal combustion engine until a speed of the second clutch is substantially synchronized with a speed of the internal combustion engine; and (d) commanding, via the control module, the second clutch to shift to the engaged position after the speed of the second clutch is substantially synchronized with the speed of the internal combustion engine. The automatic transmission shifts a transmission speed ratio from an initial speed ratio to a subsequent speed ratio when the second clutch is in the engaged position.

The present disclosure also relates to a hybrid powertrain including a control module specifically programmed to execute the steps described above.

The above features and advantages and other features and advantages of the present invention are readily apparent from the following detailed description of the best modes for carrying out the invention when taken in connection with the accompanying drawings.

DETAILED DESCRIPTION

Figure 1:
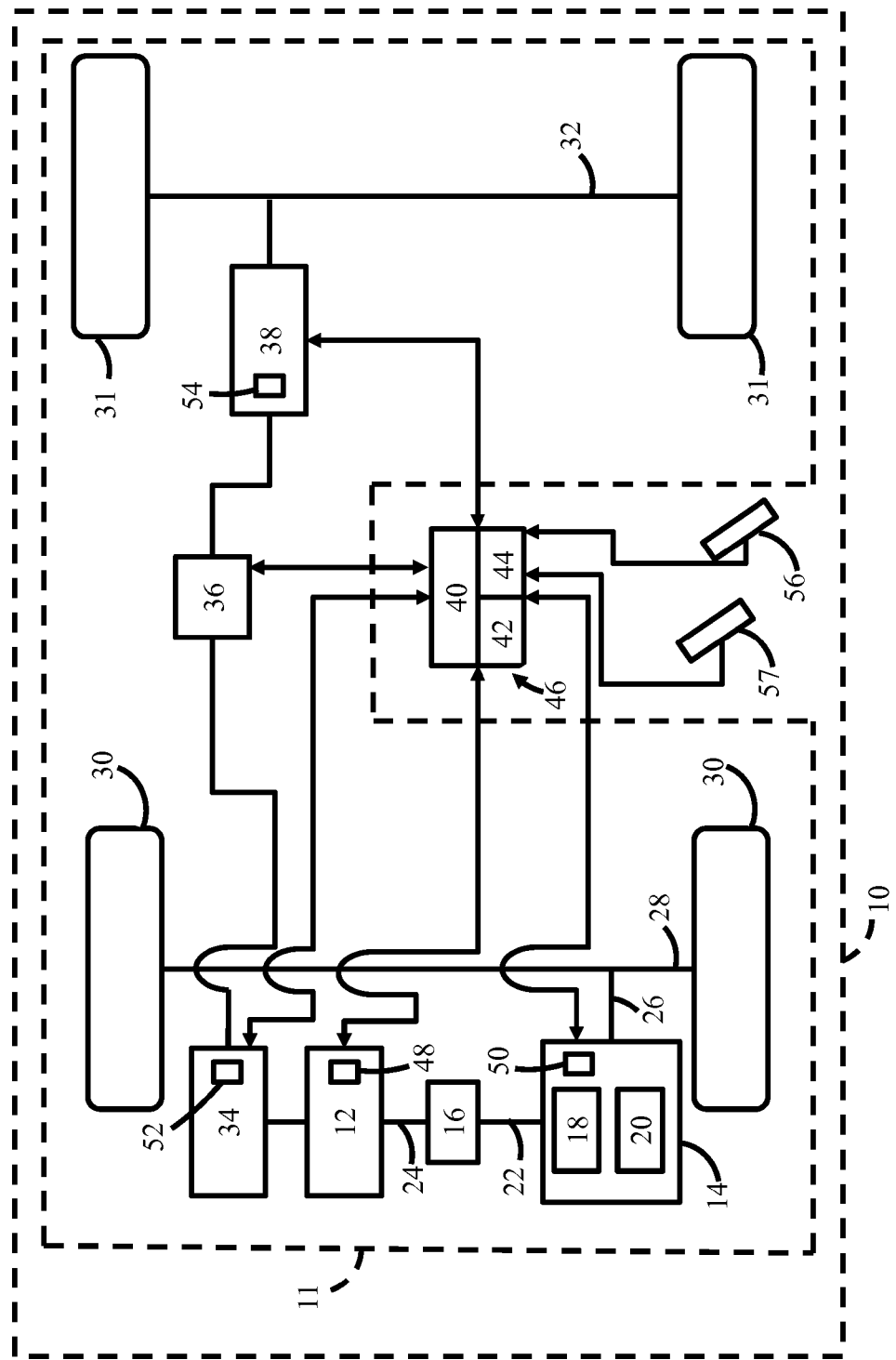
FIG. 1 is a schematic diagram of a vehicle including a hybrid powertrain.

Referring to the drawings in which like elements are identified with identical numerals throughout, FIG. 1 schematically illustrates a vehicle 10 including a hybrid powertrain 11. The hybrid powertrain 11 includes an internal combustion engine 12 configured to propel the vehicle 10, an automatic transmission 14, and a torque converter 16 configured to selectively couple the internal combustion engine 12 to the automatic transmission 14. The internal combustion engine 12 includes an output engine member 24, such as a shaft, operatively coupled to the torque converter 16. During operation of the internal combustion engine 12, the output engine member 24 can rotate and transmit torque to the automatic transmission 14 through the torque converter 16.

The automatic transmission 14 includes gear sets and a plurality of clutches (e.g., first and second clutches 18, 20) or any other suitable torque transmitting device. Although the depicted embodiment only shows two clutches (i.e., the first and second clutches 18, 20), it is contemplated that the automatic transmission 14 may include more than two clutches or any suitable torque transmission devices. Regardless of the exact number of clutches, the automatic transmission 14 includes an input transmission member 22, such as a shaft, operatively coupled to the torque converter 16. Because the torque converter 16 can selectively couple the automatic transmission 14 to the internal combustion engine 12, the input transmission member 22 can rotate upon receipt of torque from the internal combustion engine 12 via the torque converter 16. Accordingly, the input transmission member 22 may be operatively coupled to the internal combustion engine 12 and, consequently, torque generated by the internal combustion engine 12 may be transmitted to the automatic transmission 14 via the torque converter 16. Thus, the automatic transmission 14 is operatively coupled to the internal combustion engine 12.

The automatic transmission 14 includes an output transmission member 26 configured to transmit torque. The output transmission member 26 can rotate and its speed depends, at least in part, on the clutches (e.g., first and second clutches 18, 20) that are engaged in the automatic transmission 14. Each of the first and second clutches 18, 20 can move from a disengaged position to an engaged position. In the engaged position, the clutches (e.g., first and second clutches 18, 20) of the automatic transmission 14 can transmit torque and the torque originating from the internal combustion engine 12 is transmitted to a first or front axle 28 through the clutches (e.g., first and second clutches 18, 20) that are in the engaged position. Conversely, in the disengaged position, the clutches (e.g., first and second clutches 18, 20) do not transmit torque and, accordingly, those disengaged clutches do not transmit torque originating from the internal combustion engine 12. Moreover, the output transmission member 26 is coupled to the first axle 28 of the vehicle 10. Accordingly, the output transmission member 26 can transmit torque from the internal combustion engine 12 to the first axle 28. The first axle 28 is in turn coupled to the front wheels 30 of the vehicle 10. The automatic transmission 14 can shift its transmission speed ratio (e.g., gear ratio) in order to adjust the torque that is transmitted to the front wheels 30. As used herein, the term "transmission speed ratio" refers to a ratio of the speed (e.g., rotational speed) of the input transmission member 22 to the speed (e.g., rotational speed) of the output transmission member 26. Accordingly, the automatic transmission 14 is a multi-speed automatically-shiftable transmission capable of generating discrete speed ratios (e.g., gear ratios) between the input transmission member 22 and the output transmission member 26. Some clutches (e.g. first clutch 18) may be in the engaged position while other clutches (e.g., second clutch 20) may be in the disengaged position in order to control the transmission speed ratio of the automatic transmission 14. As a non-limiting example, when the first clutch 18 is in the engaged position, and the second clutch 20 is in the disengaged position, the transmission speed ratio of the automatic transmission 14 may be a first or initial speed ratio. On the other hand, when the second clutch 20 is in the engaged position, and the first clutch 18 is in the disengaged position, the transmission speed ratio of the automatic transmission 14 may be a second or subsequent speed ratio. The initial speed ratio of the automatic transmission 14 may be different from the subsequent speed ratio of the automatic transmission 14. The subsequent speed ratio may be greater than or less than the initial speed ratio. Aside from the first axle 28, the vehicle 10 includes a second or rear axle 32. The second axle 32 is coupled to the rear wheels 31 of the vehicle 10.

The hybrid powertrain 11 further includes a first electric motor-generator 34 operatively coupled to the internal combustion engine 12. The first electric motor-generator 34 is also electrically connected to an energy storage device 36, such as one or more batteries, and can therefore receive electrical energy from the energy storage device 36. The energy storage device 36 may be a direct current (DC) power supply and can store electrical energy. The first electric motor-generator 34 may operate in a motoring mode and a regenerating mode. In the motoring mode, the first electric motor-generator 34 can propel the vehicle 10 by converting the electrical energy received from the energy storage device 36 into kinetic energy. This kinetic energy is then transmitted (in the form of torque) to the front wheels 30 in order to propel the vehicle 10. In the regenerating mode, the first electric motor-generator 34 converts kinetic energy (originating from another power source such as the internal combustion engine 12) into electrical energy. This electrical energy is then supplied to the energy storage device 36.

The hybrid powertrain 11 additionally includes a second electric motor-generator 38 electrically connected to the energy storage device 36. The second electric motor-generator 38 may be operatively coupled to the second axle 32 and can operate in a motoring mode and a regenerating mode as discussed above with respect to the first electric motor-generator 34.

The vehicle 10 includes a control module 40 in communication (e.g., electronic communication) with the internal combustion engine 12, the automatic transmission 14, the first electric motor-generator 34, the energy storage device 36, and the second electric motor-generator 38. The terms "control module," "module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets. In the illustrated embodiment, the control module 40 includes at least one memory 44 (or any other non-transitory computer readable storage medium) and a processor 42 configured to execute computer readable instructions or steps stored in the memory 44 or any other computer readable storage medium. Further, the control module 40 includes a timer capable of measuring time. The control module 40 is part of a system 46 for controlling the hybrid powertrain 11. It is contemplated that the control module 40 may be part of the hybrid powertrain 11.

The control module 40 can receive input from various sensors. As a non-limiting example, the vehicle 10 includes an engine speed sensor 48 of the internal combustion engine 12. The engine speed sensor 48 can measure the engine speed of the internal combustion engine 12 and can generate an input signal indicative of the engine speed. The control module 40 is in electronic communication with the engine speed sensor 48 and can therefore receive the input signal from the engine speed sensor 48. Accordingly, the control module 40 can determine the engine speed of the internal combustion engine 12 based on the input signal received from the engine speed sensor 48.

The control module 40 is also in communication (e.g., electronic communication) with at least one transmission speed sensor 50 and can therefore receive input signals from the transmission speed sensor 50. The automatic transmission 14 may include more than one transmission speed sensor 50 capable of measuring the speed of various components of the automatic transmission 14. For instance, the transmission speed sensor 50 can measure the speed of the output transmission member 26. The control module 40 can therefore determine the speed of the output transmission member 26 based on the input from the transmission speed sensor 50. The transmission speed sensor 50 can also measure the speed of the first and second clutches 18, 20. Accordingly, the control module 40 can determine the speed of the first and second clutches 18, 20 based on the input signals received from the transmission speed sensor 50.

The control module 40 is also in communication (e.g., electronic communication) with a first motor speed sensor 52 and can therefore receive input signals from the first motor speed sensor 52. The first motor speed sensor 52 can measure the motor speed of the first electric motor-generator 34 and can generate an input signal indicative of the motor speed of the first electric motor-generator 34. The control module 40 can determine the motor speed of the first electric motor-generator 34 based on the input signal of the first motor speed sensor 52. The motor speed of the first electric motor-generator 34 may be referred to as the first motor speed.

The control module 40 is also in communication (e.g., electronic communication) with a second motor speed sensor 54 and can therefore receive input signals from the second motor speed sensor 54. The second motor speed sensor 54 can measure the motor speed of the second electric motor-generator 38 and can generate an input signal indicative of the motor speed of the second electric motor-generator 38. The control module 40 can determine the motor speed of the second electric motor-generator 38 based on the input signal of the second motor speed sensor 54. The motor speed of the second electric motor-generator 38 may be referred to as the second motor speed.

The control module 40 is also in communication (e.g., electronic communication) with a first actuator 56, such as an accelerator pedal. A vehicle operator can actuate (e.g., press) the first actuator 56 to request more torque from the hybrid powertrain 11. Conversely, releasing the first actuator 56 requests less torque from the hybrid powertrain 11. The control module 40 can receive the input from the first actuator 56 and command the internal combustion engine 34, the automatic transmission 14, the first electric motor-generator 34, and the second electric motor-generator 38 in order to generate the torque requested by the vehicle operator. The vehicle 10 additionally includes a second actuator 57, such as a brake pedal, configured to actuate the brakes (not shown) of the vehicle 10. The second actuator 57 is in communication (e.g., electronic communication) with the control module 40. Accordingly, the control module 40 can receive input from the second actuator indicative that the vehicle operator requested less torque from the hybrid powertrain 11.

Figure 2:
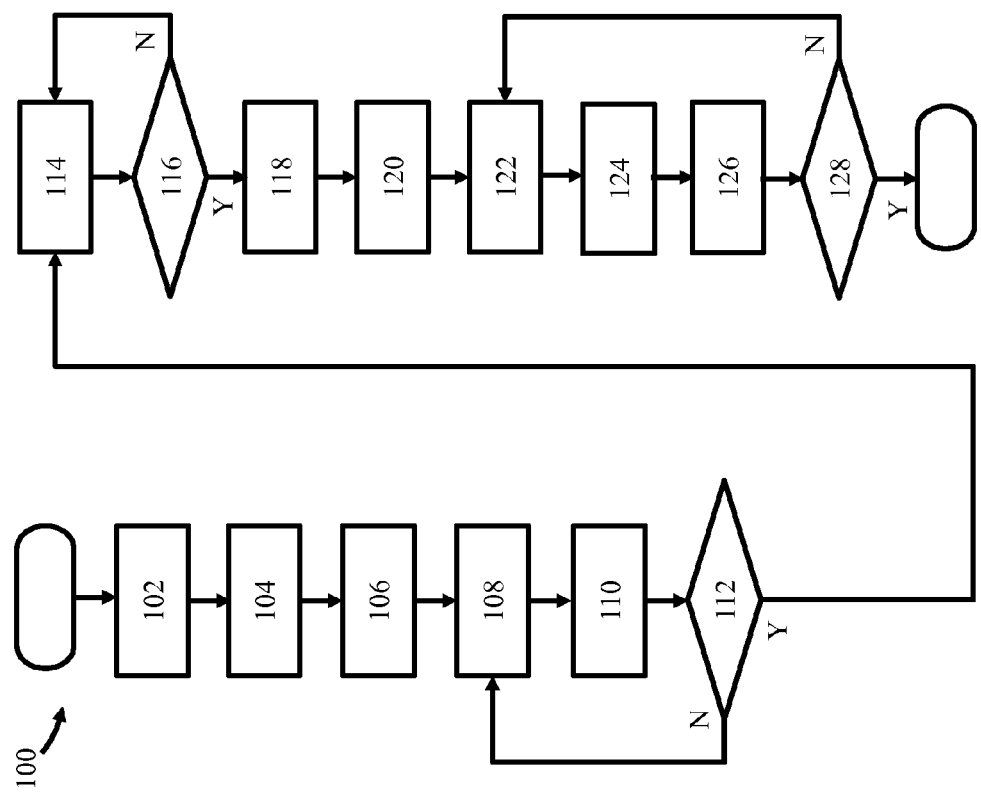
FIG. 2 is a flowchart of a method for controlling a hybrid powertrain.

FIG. 2 is a flowchart of a method 100 for controlling the hybrid powertrain 11. The control system 46 can control the hybrid powertrain 11 in accordance with the method 100. The method 100 begins at step 102. Step 102 entails receiving, via the control module 40, a torque request. As used herein, the term "torque request" includes a request from the vehicle operator to increase or decrease the current torque generated by the hybrid powertrain 11 in order to reach a requested torque. The torque request received by the control module 40 may be based on inputs from the first actuator 56 and second actuator 57 and an engine torque model. Accordingly, the control module 40 is programmed to receive a torque request, which may be based on inputs from the first actuator 56, second actuator 57, or both. Then, the method 100 continues to step 104.

Step 104 entails determining, via the control module 40, the current torque in the first and second axles 28, 32. The current torque in the first and second axles 28, 32 may be referred to as the current axle torque. The control module 40 can determine the current axle torque based on the inputs from the sensors such as the transmission speed sensor 50, the engine speed sensor 48, the first motor speed sensor 52, and the second motor speed sensor 54 and an engine torque model. Thus, in step 104, the control module 40 is programmed to determine the current axle torque based, at least in part, on inputs from the transmission speed sensor 50, the engine speed sensor 48, the first motor speed sensor 52, the second motor speed sensor 54, or a combination thereof. Next, the method 100 proceeds to step 106.

Step 106 entails determining, via the control module 40, a first torque phase time threshold and release rate based, at least in part, on the current axle torque. In the present disclosure, the term "first torque phase time threshold" refers a predetermined time from the moment when an off-going clutch (e.g., the first clutch 18) is ready to be moved to the disengaged position in order to shift the automatic transmission 14 from an initial speed ratio to a subsequent speed ratio. As used herein, the term "off-going clutch" refers to the clutch (e.g., first clutch 18 or second clutch 20) that needs to move from the engaged position to the disengaged position in order to shift the transmission speed ratio from the initial speed ratio to the subsequent speed ratio. The first torque phase time threshold may be obtained from a lookup table stored in the memory 44 of the control module 40. The term "release rate" means the rate at which the off-going clutch (e.g., first clutch 18) moves from the engaged position to the disengaged position over time. In other words, the term "release rate" means the rate at which the off-going clutch moves toward the disengaged position over time. The release rate may be obtained from a lookup table stored in the memory 44 of the control module 40. Then, the method 100 proceeds to step 108.

Step 108 entails commanding, via the control module 40, the off-going clutch (e.g., first clutch 18) of the automatic transmission 14 to shift from the engaged position to the disengaged position at the release rate determined in step 106 in response to the torque request received in step 102. In other words, the step 108 entails gradually decreasing the torque capacity of the off-going clutch (e.g., the first clutch 18) at the release rate determined in step 106. The torque capacity of a clutch, such as the first clutch 18, refers to the ability of that clutch to transmit torque. Thus, in step 108, the control module 40 is programmed to command the off-going clutch (e.g., first clutch 18) of the automatic transmission 14 to move gradually from the engaged position to the disengaged position. In response to the command from the control module 40, the off-going clutch (e.g., the first clutch 18) moves from the engaged position to the disengaged position at the release rate determined in step 106. Therefore, step 108 may also entail moving the off-going clutch (e.g., the first clutch) from the engaged position to the disengaged position at the release rate determined in step 106. Then, the method 100 continues to step 110. As the clutch torque lowers to the disengage state the control module 40, reduces input torque to the transmission by lowering the engine torque, the first motor output torque or both. So that as the offgoing clutch progresses to disengage state the clutch does not slip much.

Step 110 entails commanding, via the control module 40, the second electric motor-generator 38 to increase its output torque (i.e., the second motor output torque) while the off-going clutch (e.g., the first clutch 18) is shifting from the engaged position to the disengaged position. In other words, the control module 40 is programmed to command the second electric motor-generator 38 to increase its output torque. In response to the command from the control module 40, the second electric motor-generator 38 increases its output torque, thereby increasing the torque in the second axle 32. Therefore, step 110 may also entail increasing the output torque of the second electric-motor generator 38 in response to a command from the control module 40. At this point, the automatic transmission 14 may be in a neutral state, and the internal combustion engine 14 operates in deceleration fuel cut-off (DFCO) mode. When operating in the DFCO mode, the internal combustion engine 12 does not use fuel. Next, the method 100 continues to step 112.

Step 112 comparing the first torque phase time threshold determined in step 106 with a shift time in order to determine if the shift time is less than the first torque phase time threshold. In the present disclosure, the term "shift time" refers to the time that elapses since the torque request was received by the control module 40. The control module 40 includes a timer that measures the time since the torque request was received by the control module 40. If the shift time is less than the first torque phase time threshold, then the method 100 returns to step 108. Conversely, if the shift time is not less than the first torque phase time threshold, then the method 100 proceeds to step 114.

Step 114 entails commanding, via the control module 40, the first electric motor-generator 34 to transmit torque to the internal combustion engine 12 in order to substantially synchronize the speed of the internal combustion engine 12 with the speed of the on-coming clutch (e.g., the second clutch 20). In other words, step 114 entails commanding the first electric motor-generator 34 to transmit torque to the internal combustion engine 12 until the speed (e.g. rotational speed) of the output engine member 24 (i.e. the engine speed) is substantially synchronized with the speed (e.g., rotational speed) of the on-coming clutch (e.g. the second clutch 20), thereby providing a smooth transmission shift and minimizing fuel consumption during the transmission shift. Then, the method 100 proceeds to step 116. The control module 40 is programmed to command the first electric motor-generator 34 to transmit torque to the internal combustion engine 12. Because the first electric motor-generator 34 may be directly coupled to the internal combustion engine 12, step 114 may entail directly transmitting torque from the first electric motor-generator 34 to the internal combustion engine 12 in response to a command from the control module 40. Then, the method 100 continues to step 116.

Step 116 entails comparing, via the control module 40, the speed of the internal combustion engine 12 (i.e. the engine speed) with the speed of the on-coming clutch (i.e., the oncoming clutch speed or second clutch speed) in order to determine if the engine speed is substantially synchronized with the on-coming clutch speed. In other words, in step 116, the control module 40 is programmed to compare the engine speed with the on-coming clutch speed (or the second clutch speed). The engine speed is substantially synchronized with the on-coming clutch speed when the engine speed is substantially equal to the on-coming clutch speed such that the on-coming clutch experiences minimal vibrations when it is moved to the engaged position. If the engine speed is not substantially synchronized with the on-coming clutch speed, then the method returns to step 114. Conversely, if the engine speed is substantially synchronized with the on-coming clutch speed, then the method 110 continues to step 118.

Step 118 entails, via the control module 40, the finishing axle torque in the first and second axle 28, 32. In the present disclosure, the "finishing axle torque" refers to the expected torque in the first and second axle 28, 32 after the automatic transmission 14 shifts from the initial speed ratio to the subsequent speed ratio. The control module 40 can determine the finishing axle torque based on the inputs from the sensors such as the transmission speed sensor 50, the engine speed sensor 48, the first motor speed sensor 52, and the second motor speed sensor 54. Thus, in step 118, the control module 40 is programmed to determine the finishing axle torque based, at least in part, on inputs from the transmission speed sensor 50, the engine speed sensor 48, the first motor speed sensor 52, the second motor speed sensor 54, or a combination thereof. Next, the method 100 proceeds to step 120.

Step 120 entails determining, via the control module 40, a second torque phase time threshold and an apply rate based, at least in part, on the finishing axle torque. In the present disclosure, the term "second torque phase time threshold" refers a predetermined time from the point when an on-coming clutch (e.g., the second clutch 20) is ready to be moved to the engaged position in order to shift the automatic transmission 14 from an initial speed ratio to a subsequent speed ratio. As used herein, the term "on-coming clutch" refers to the clutch (e.g., first clutch 18 or second clutch 20) that needs to move from the disengaged position to the engaged position in order to shift the transmission speed ratio from the initial speed ratio to the subsequent speed ratio. The second torque phase time threshold may be obtained from a lookup table stored in the memory 44 of the control module 40. The term "apply rate" means the rate at which the on-coming clutch (e.g., second clutch 20) moves from the disengaged position to the engaged position over time. In other words, the "apply rate" is the rate at which the on-coming clutch moves toward the engaged position over time. The apply rate may be obtained from a lookup table stored in the memory 44 of the control module 40. Then, the method 100 proceeds to step 122.

Step 122 entails commanding, via the control module 40, the on-coming clutch (e.g., second clutch 20) of the automatic transmission 14 to shift from the disengaged position to the engaged position at the apply rate determined in step 120 in response to the torque request received in step 102. In other words, the step 122 entails gradually increasing the torque capacity of the on-coming clutch (e.g., the second clutch 20) at the apply rate determined in step 120. The torque capacity of a clutch, such as the second clutch 20, refers to the ability of that clutch to transmit torque. Thus, in step 108, the control module 40 is programmed to command the on-coming clutch (e.g., second clutch 20) of the automatic transmission 14 to move gradually from the disengaged position to the engaged position. In response to the command from the control module 40, the on-coming clutch (e.g., the second clutch 20) moves from the disengaged position to the engaged position at the apply rate determined in step 120. Therefore, step 120 may also entail moving the on-coming clutch (e.g., the second clutch 20) from the disengaged position to the engaged position at the apply rate determined in step 120. Then, the method 100 continues to step 124.

Step 124 entails commanding, via the control module 40, the second electric motor-generator 38 to decrease its output torque (i.e., the second motor output torque). In other words, the control module 40 is programmed to command the second electric motor-generator 38 to decrease its output torque. In response to the command from the control module 40, the second electric motor-generator 38 decreases its output torque. Therefore, step 124 may also entail decreasing the output torque of the second electric-motor generator 38 in response to a command from the control module 40. Then, the method 100 continues to step 126.

Step 126 entails commanding, via the control module 40, the first electric motor-generator 34 to increase its output torque (i.e., the first motor output torque) and or the engines torque at a rate matching the increase torque capacity of the oncoming clutch so that the oncoming clutch does not slip much. In other words, the control module 40 is programmed to command the first electric motor-generator 34 to increase its output torque. In response to the command from the control module 40, the first electric motor-generator 34 increases its output torque, thereby increasing the torque in the first axle 28. Therefore, step 126 may also entail increasing the output torque of the first electric-motor generator 34 in response to a command from the control module 40. Then, the method 100 continues to step 128.

Step 128 comparing the second torque phase time threshold determined in step 120 with the shift time in order to determine if the shift time is less than the first torque phase time threshold. In the present disclosure, the term "shift time" refers to the time that elapses since the torque request was received by the control module 40. The control module 40 includes a timer that measures the time since the torque request was received by the control module 40. If the shift time is less than the second torque phase time threshold, then the method 100 ends. Conversely, if the shift time is not less than the second torque phase time threshold, then the method 100 proceeds to step 122.

While the best modes for carrying out the invention have been described in detail, those familiar with the art to which this invention relates will recognize various alternative designs and embodiments for practicing the invention within the scope of the appended claims.

The invention claimed is:

1. A method of controlling a hybrid powertrain, the hybrid powertrain including an internal combustion engine, an electric motor-generator operatively coupled to the internal combustion engine, an automatic transmission operatively coupled to the internal combustion engine, and the automatic transmission having a first clutch and a second clutch, the method comprising:

receiving, via a control module, a torque request;

commanding, via the control module, the first clutch of the automatic transmission to shift to a disengaged position in response to the torque request;

commanding, via the control module, the electric motor-generator to transmit torque to the internal combustion engine until a speed of the second clutch is substantially synchronized with a speed of the internal combustion engine;

commanding, via the control module, the second clutch to shift to the engaged position after the speed of the second clutch is substantially synchronized with the speed of the internal combustion engine; and wherein the automatic transmission shifts a transmission speed ratio from an initial speed ratio to a subsequent speed ratio when the second clutch is in the engaged position.

2. The method of claim 1, wherein the hybrid powertrain includes a first and second axle operatively coupled to the internal combustion engine, and the method further comprising determining, via the control module, a current torque in the first and second axles.

3. The method of claim 2, wherein the electric motor-generator is a first motor-generator, the hybrid powertrain includes a second electric motor-generator operatively coupled to the second axle, and the method further comprises commanding the second electric motor-generator to increase an output torque thereof while the first clutch is shifting to the disengaged position.

4. The method of claim 3, further comprising commanding, via the control module, the second electric motor-generator to decrease the output torque thereof after the speed of the second clutch is substantially synchronized with the speed of the internal combustion engine.

5. The method of claim 4, further comprising commanding, via the control module, the first electric motor-generator to decrease an output torque thereof after the speed of the second clutch is substantially synchronized with the speed of the internal combustion engine.

6. The method of claim 5, wherein the second electric motor-generator is directly coupled to the second axle, and the method further comprises increasing torque in the second axle when the control module commands the second electric motor-generator to increase the output torque thereof.

7. The method of claim 6, wherein the first electric motor-generator is directly coupled to the internal combustion engine, and the method further includes directly transmitting torque from the first electric motor-generator to the internal combustion engine when the control module commands the first electric motor-generator to transmit torque transmit torque to the internal combustion engine until the speed of the second clutch is substantially synchronized with the speed of the internal combustion engine.

8. The method of claim 7, further comprising determining a release rate for the first clutch, wherein the release rate is a rate at which the first clutch moves toward the disengaged position over time.

9. The method of claim 8, further comprising determining an apply rate for the second clutch, wherein the apply rate is a rate at which the second clutch moves from the engaged position to the disengaged position over time.

10. The method of claim 1, further comprising comparing a shift time with a predetermined time threshold in order to determine if the shift time is less than the predetermined time threshold, wherein the shift time is a time that elapses since the torque request was received by the control module, and the control module commands the first electric motor-generator to transmit torque to the internal combustion engine until the speed of the second clutch is substantially synchronized with the speed of the internal combustion engine only if the shift time is not less than the predetermined time threshold.

11. The method of claim 10, wherein the predetermined time threshold is a first predetermined time threshold, and the method further comprises comparing the shift time with a second predetermined time threshold in order to determine if the shift time is less than the second predetermined time threshold, and gradually increasing a torque capacity of the second clutch only if the shift time is less than the second predetermined time threshold.

12. A hybrid powertrain, comprising:
an internal combustion engine;
a first axle operatively coupled to the internal combustion engine;
a second axle operatively coupled to the internal combustion engine;
a first electric motor-generator operatively coupled to the internal combustion engine;
a second electric motor-generator directly coupled to the second axle;
an automatic transmission operatively coupled to the internal combustion engine, the automatic transmission including a first clutch and a second clutch;
a control module in communication with the internal combustion engine, the first electric motor-generator, the second electric motor-generator, and the automatic transmission, the control module being programmed to:
receive a torque request;
command the first clutch of the automatic transmission to shift to a disengaged position in response to the torque request;
command the first electric motor-generator to transmit torque to the internal combustion engine until a speed of the second clutch is substantially synchronized with a speed of the internal combustion engine;
command the second clutch to shift to the engaged position after the speed of the second clutch is substantially synchronized with the speed of the internal combustion engine; and
wherein the automatic transmission is configured to shift a transmission speed ratio from an initial speed ratio to a subsequent speed ratio when the second clutch is in the engaged position.

13. The hybrid powertrain of claim 12, wherein the control module is programmed to determine a current torque in the first and second axles.

14. The hybrid powertrain of claim 13, wherein the control module is programmed to command the second electric motor-generator to increase an output torque thereof while the first clutch is shifting to the disengaged position.

15. The hybrid powertrain of claim 14, wherein the control module is programmed to command the second electric motor-generator to decrease the output torque thereof after the speed of the second clutch is substantially synchronized with the speed of the internal combustion engine.

16. The hybrid powertrain of claim 15, wherein the control module is programmed to command the first electric motor-generator to decrease an output torque thereof after the speed of the second clutch is substantially synchronized with the speed of the internal combustion engine.

17. The hybrid powertrain of claim 16, wherein the second electric motor-generator is configured to increase torque in the second axle when the control module commands the second electric motor-generator to increase the output torque thereof.

18. The hybrid powertrain of claim 17, wherein the first electric motor-generator is directly coupled to the internal combustion engine, and the first electric motor-generator is configured to directly transmit torque from the first electric motor-generator to the internal combustion engine when the control module commands the first electric motor-generator to transmit torque to the internal combustion engine until the speed of the second clutch is substantially synchronized with the speed of the internal combustion engine.

19. The hybrid powertrain of claim 16, further comprising a torque converter interconnecting the internal combustion engine and the automatic transmission, wherein the first electric motor-generator is continuously coupled to the internal combustion engine.

* * * * *